US009167631B2

(12) United States Patent
Paull

(10) Patent No.: US 9,167,631 B2

(45) Date of Patent: Oct. 20, 2015

(54) POWER SYSTEM COMPONENT PROTECTION SYSTEM FOR USE WITH AN INDUCTION HEATING SYSTEM

(75) Inventor: Ian Alan Paull, Henrietta, NY (US)

(73) Assignee: Ameritherm, Inc., Scottsville, NY (US)

( * ) Notice: Subject to any disclaimer, the term of this patent is extended or adjusted under 35 U.S.C. 154(b) by 2474 days.

(21) Appl. No.: 11/844,741

(22) Filed: Aug. 24, 2007

(65) Prior Publication Data

US 2008/0051915 A1 Feb. 28, 2008

Related U.S. Application Data

(60) Provisional application No. 60/840,047, filed on Aug. 25, 2006.

(51) Int. Cl.

*H05B 6/10* (2006.01)
*G05B 9/02* (2006.01)
*H05B 6/04* (2006.01)

(52) U.S. Cl.

CPC .................................... *H05B 6/04* (2013.01)

(58) Field of Classification Search

CPC ........................................................ H05B 6/04
USPC ......... 219/600, 634, 632, 677, 663, 650, 625, 219/660–661, 667–668, 702, 715–719; 700/79, 12, 21, 65, 91, 80, 103, 174, 700/204.234, 244, 259

See application file for complete search history.

(56) References Cited

U.S. PATENT DOCUMENTS

| | | | | |
|---|---|---|---|---|
| 3,887,781 | A * | 6/1975 | Peters, Jr. | 219/627 |
| 4,747,048 | A * | 5/1988 | Mueller | 700/79 |
| RE33,644 | E * | 7/1991 | Hall | 219/665 |
| 5,729,653 | A * | 3/1998 | Magliochetti et al. | 392/485 |
| 6,956,189 | B1 * | 10/2005 | Verhagen | 219/632 |
| 7,015,439 | B1 * | 3/2006 | Thomas et al. | 219/667 |
| 2004/0021449 | A1 * | 2/2004 | Stenestam et al. | 323/255 |
| 2006/0157149 | A1 * | 7/2006 | Hillam et al. | 141/198 |

* cited by examiner

*Primary Examiner* — Dana Ross
*Assistant Examiner* — Ket D Dang
(74) *Attorney, Agent, or Firm* — Rothwell, Figg, Ernst & Manbeck, P.C.

(57) ABSTRACT

When a power system experiences a disruptive event, conditions may exist that threaten the survival of power devices used in the system. Embodiments described herein provide an improved means of protecting these devices under such circumstances.

25 Claims, 2 Drawing Sheets

POWER SYSTEM COMPONENT PROTECTION SYSTEM FOR USE WITH AN INDUCTION HEATING SYSTEM

BACKGROUND OF THE INVENTION

1. Field of the Invention

The present invention relates to power system protection systems.

2. Discussion of the Background

In systems that use a power system to provide power to a load, it is often desirable to have a protection system in place for protecting the various components of the power system (e.g., the transistors and other components of the power system). For example, a shorted output or mismatched load can cause damage to the power system components. Many power systems are designed with power handling components whose characteristics have been selected to insure reliable operation under normal operating conditions, and to insure survivability under some extremes of temporary conditions. But there are trade-offs made between cost and the margin on such characteristics. In some types of power systems, the available margin is limited, in the sense that more capable devices are not available.

Often, protection systems can sense temporary unusual operating conditions and take protective action. Common solutions include non-resettable fuses, circuit breakers and self resetting components. These solutions may reduce fire hazard, but are often too slow to protect high speed power components from damage. Another common solution is to enter a non-operational fault mode by electronic shutdown and await manual reset. Some systems may have an automatic reset, one or more times.

SUMMARY OF THE INVENTION

The present invention provides a protection system configured to sense a condition that may threaten reliable operation of a power system (i.e., a "threat condition") and then take corrective action (e.g., disable the power system output) upon sensing such a threat condition. The protection system may employ an adaptable algorithm to adapt a power system reset condition to assure the briefest possible interruption to service consistent with reliable operation. For example, based on recent operational characteristics of the power system, the protection system may vary the time between reset attempts and/or vary the duration that it will disable the power system output.

A complex model of thermal or other overload characteristics of power components may be employed to aid the protection system in selecting appropriate reset conditions. The protection system may also maintain a reset history log, locally or remotely, to aid in the selection of delay before the next reset. In systems that allow a non-operating protective mode, the protection system may also use this available information to determine when an automated reset is no longer appropriate, and to enter into a persistent protective mode. The protection system may also maintain operating logs to be used to establish if the power system has an exceptional history that may need attention. Further, details of operational policies may be maintained as a configurable set of rules and kept locally or maintained at a remote site.

In some embodiments, the protection system may include the following temperature sensors: a sensor to measure ambient temperature, a sensor to measure switching device temperature and a sensor to measure the temperature of water (if any) that is used to cool components of the power system. Additionally, the protection system may monitor the operating frequency of the power system, the magnitude of overload experienced by switching devices within the power system, AC mains voltage, and other information collected about the power system. All or some of these characteristics may be used to enhance reliability of a power system (e.g., a power system used in an induction heating system). For example, the protection system could provide a short disable interval of the power system on sensing a first threat condition, and then provide a longer or shorter disable interval on sensing a subsequent threat condition depending on the characteristics mentioned above (i.e., temperature, operating frequency, etc.). In systems that allow a non-operating protective mode, such a mode could be a condition of last resort and require manual intervention after the cause has been investigated.

In the case of an RF heating system (e.g., and RF induction heating system or an RF dielectric heating system), which typically includes a power system coupled to a radio frequency (RF) field generator (e.g., a coil or electrodes for producing an RF field) that is used to heat a work piece, the threat conditions being monitored by the protection system may include inadvertent shorting of the RF field generator.

An RF heating system, according to one particular embodiment of the invention, includes: a radio frequency (RF) field generator; a power system coupled to the RF field generator and configured to provide power to the RF field generator; and a protection system coupled to the power system, the protection system being configured to: (a) monitor the power system for the presence of a threat condition; (b) automatically reduce the amount of power delivered to the RF field generator by the power system for a determined amount of time in response to detecting a threat condition; and (c) automatically increase the amount of power delivered to the RF field generator by the power system after the determined amount of time has elapsed, wherein the determined amount of time is based, at least in part, on one or more of the following: (a) a sensed temperature, (b) the number of threat conditions that have occurred (i) within the last X seconds, wherein X is greater than zero, and/or (ii) since the occurrence of a certain event, (c) the specific threat condition that was detected, (d) an operating frequency of the power system, (e) a magnitude of overload experienced by switching devices within the power system, and (f) a set of rules.

A method, according to one particular embodiment of the present invention, includes: monitoring a power system for the presence of a threat condition; reducing the output of the power system (e.g., shutting down the power system or otherwise reducing the output of the power system) if a threat condition is detected; selecting a disable interval for the power system; and after waiting the determined disable interval, increasing the output of the power system (e.g., increasing the output to the output level that existed immediately prior to the detection of the threat condition), wherein the selection of the disable interval is based, at least in part, on one or more of the following: (a) a sensed temperature, (b) the number of threat conditions that have occurred (i) within the last X seconds, wherein X is greater than zero, and/or (ii) since the occurrence of a certain event, (c) the specific threat condition that was detected, (d) an operating frequency of the power system, and (e) the magnitude of overload experienced by switching devices within the power system.

A method, according to another particular embodiment of the present invention, includes: (a) using a power system comprising switching devices to provide power to an RF field generator; (b) while the power system is providing power to the RF field generator, automatically detecting a condition that may be harmful to the switching devices; (c) in response to detecting the condition, automatically causing the power system to reduce the amount of power provided to the RF field generator; (d) after causing the power system to reduce the amount of power provided to the RF field generator, waiting for a determined amount of time to elapse; and (e) immediately after the determined amount of time has elapsed, causing the power system to increase the amount of power provided to the RF field generator.

The above and other features of embodiments of the present invention are described below with reference to the accompanying drawings.

BRIEF DESCRIPTION OF THE DRAWINGS

The accompanying drawings, which are incorporated herein and form part of the specification, help illustrate various embodiments of the present invention. In the drawings, like reference numbers indicate identical or functionally similar elements.

DETAILED DESCRIPTION OF PREFERRED EMBODIMENTS

Figure 1:
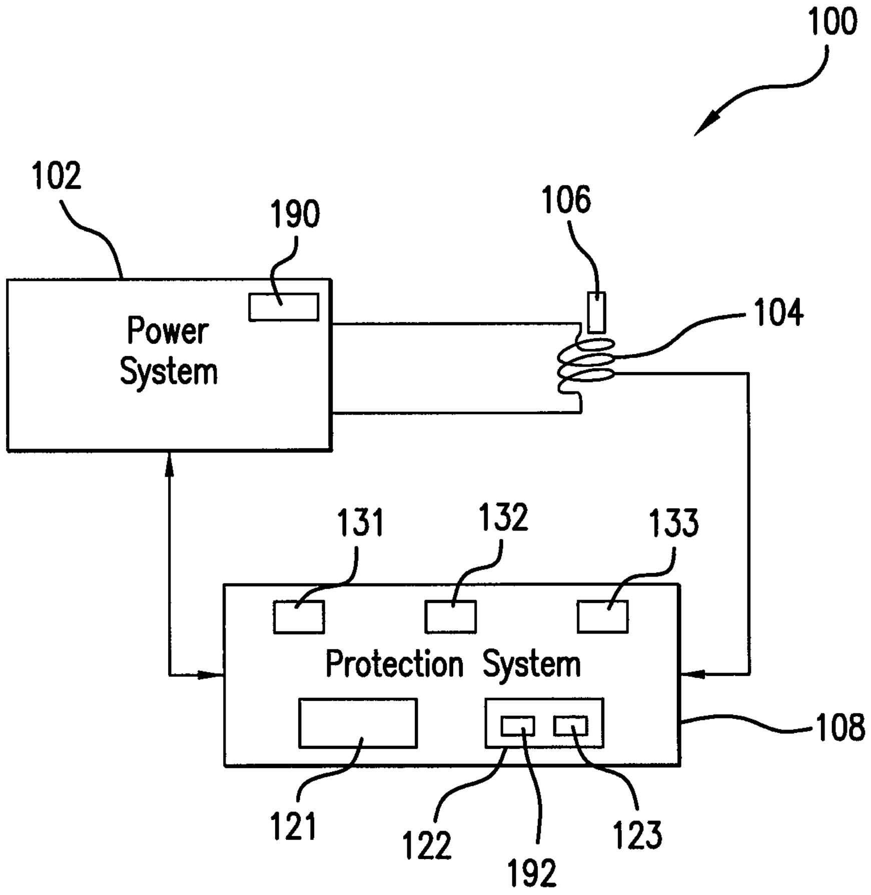
FIG. 1 illustrates a system according to an embodiment of the invention.

FIG. 1 illustrates an induction heating system 100 according to an embodiment of the invention. System 100 includes a power system 102, a work coil 104, which is coupled to the power system and configured to produce an RF field for heating a work piece 106 when power is supplied to the coil, and a protection system 108 for protecting the various components of power system 102, including the switching devices (e.g., transistors) 190 of the power system 102.

As illustrated in FIG. 1, protection system 108 may include a data processing unit 121 (e.g., one or more microprocessors), a storage unit 122 for storing software 123 that is configured to be executed by the data processing unit 121, thereby causing the data processing unit to perform the operations specified by the software, and a plurality of sensors 131-133. In some embodiments, sensor 131 is configured to sense ambient temperature, sensor 132 is configured to sense the temperature switching devices 190, sensor 133 is configured to sense the temperature of the water (if any) that is used to cool components of the power system. Additionally, the protection system 108 is in communication with power system 102 such that protection system 102 may monitor the operating frequency of the power system and may determine whether a threat condition is present and the magnitude of the threat condition.

Figure 2:
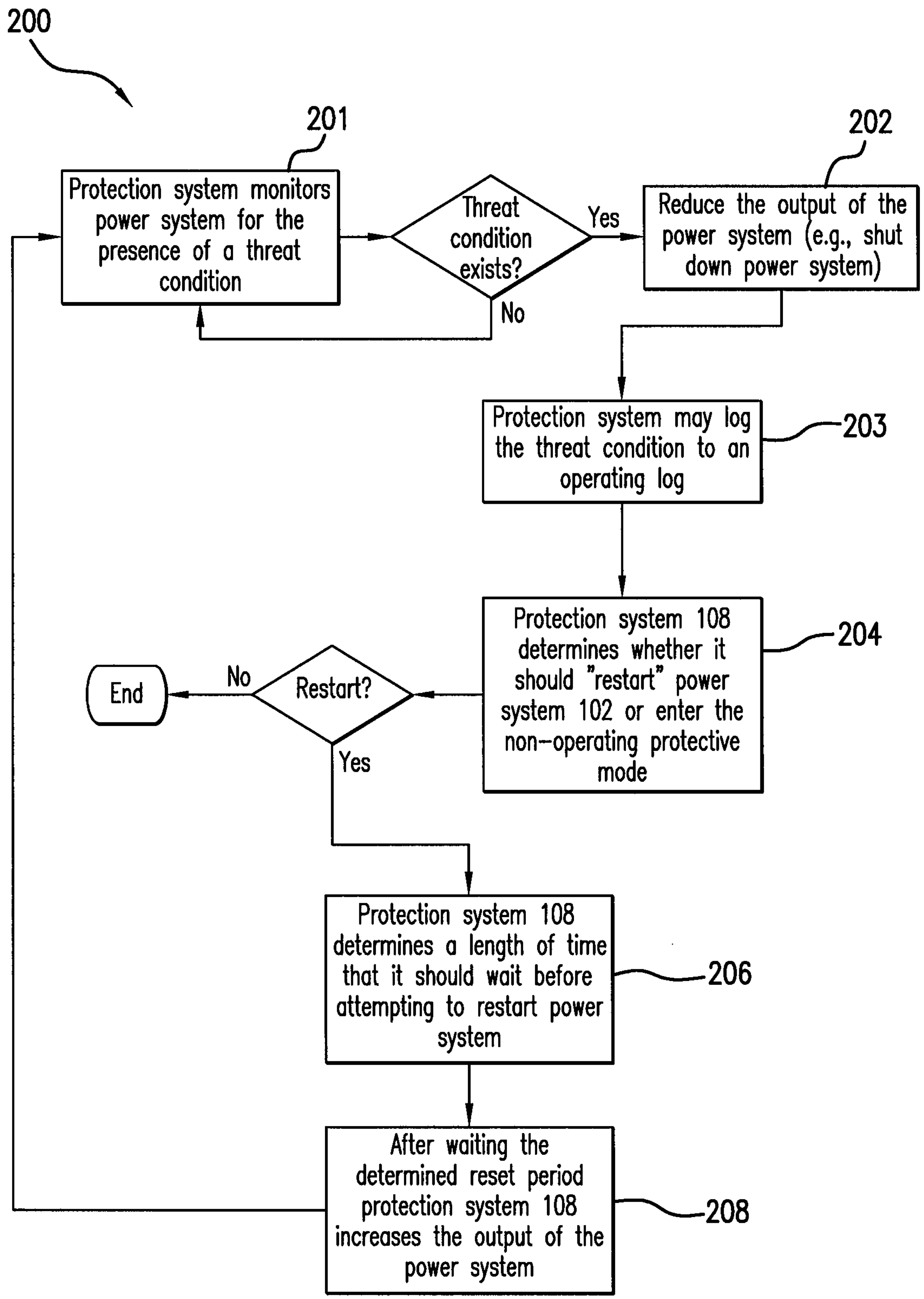
FIG. 2 illustrates a process according to an embodiment of the invention.

Referring to FIG. 2, FIG. 2 is a flow chart illustrating a process, according to one embodiment, that is defined by software 123. Process 200 may begin in step 201, where protection system monitors power system for the presence of a threat condition (e.g., a shorted output or mismatched load). If protection system 108 senses a threat condition, then process 200 may proceed to step 202, where protection system 108 reduces the output of power system 102 (e.g., causes power system 102 to cease providing power to work coil 104). Next (step 203) protection system may log the threat condition to an operating log 192 (e.g., a reset history log). As an example, protection system 108 may record an identifier representing the sensed threat condition and the time the condition was sensed (the time could be a relative time (e.g., 5 minutes after the beginning of operation) or an absolute time (e.g., 1:35 pm)).

Next (step 204), protection system 108 determines whether it should restart power system 102 or enter a non-operating protective mode. If the latter, then process 200 may end, otherwise process 200 may proceed to step 206.

In step 206, protection system 108 determines a length of time that it should wait before attempting to restart power system 102 (i.e., a "disable interval"). In step 208, after waiting the determined disable interval (e.g., a 0.1 second interval, a 0.5 second interval, a 1 second interval, a 2 second interval, etc), protection system 108 restarts power system 102 (e.g., causes power system 102 to resume providing power to work coil 104 or other RF field generator). After step 208, process 200 may return to step 202.

Referring to step 204, in determining whether to restart power system or enter the non-operating protective mode, protection system 108 may consider one or more of the following factors: (1) the temperature sensed by one or more of sensors 131-133, (2) the number of threat conditions that have occurred with the last X amount of time (e.g., the last 5 minutes) (X can be configurable) (this information can be determined from the reset history log) or since the occurrence of a certain event, (3) the specific threat condition that was sensed, (4) the operating frequency of the power system, (5) the magnitude of overload experienced by switching devices within the power system, etc.

Similarly, referring to step 206, in determining the disable interval, protection system 108 may consider one or more of the same factors listed immediately above.

As an example, in step 206, protection system 108 may determine the length of the waiting period based, at least in part, on a determination of the number of threat conditions that have occurred within the last X amount of time (X can be some predetermined period) or the number of threat conditions that have occurred since some predetermined event (e.g., the number of threat conditions that have occurred since initialization of power system 102). As a more specific example, upon detecting the first threat condition since initialization of power system 102, protection system may select a disable interval of 0.1 seconds, and upon detecting the second threat condition since initialization of power system 102, protection system may select a disable interval of 0.3 seconds. The disable interval may continue to increase for each subsequently detected threat condition. After detecting some number of threat conditions since initialization, protection system 108 may determine to enter the non-operating protective mode. As another specific example, in some embodiments, the disable interval is initially selected to be 0.1 seconds and is not increased unless 3 or more threat conditions occur within a period of 30 seconds.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and some steps may be performed simultaneously.

What is claimed is:

1. An RF heating system, comprising:

an radio frequency (RF) field generator;

a power system coupled to the RF field generator and configured to provide power to the RF field generator, the power system comprising one or more switching devices; and a protection system coupled to the power system, the protection system being configured to:

(a) detect the presence of a threat condition that threatens reliable operation of the power system; and (b) select a protection procedure from a set of at least two protection procedures and perform the selected protection procedure response to detecting the presence of the threat condition that threatens reliable operation of the power system, the set of at least two protection procedures comprising a first protection procedure and a second protection procedure, wherein the first protection procedure comprises: (i) automatically reducing the power delivered to the RF field generator by the power system for a disable interval and then (ii) automatically increasing the power delivered to the RF field generator by the power system in response to the disable interval elapsing, the second safety procedure comprises placing the power system in a non-operating, persistent protection mode, and the protection system is configured such that the disable interval based, at least in part, on one or more of the following: (a) a sensed temperature, (b) a number of threat conditions that have occurred within the last X seconds, wherein X is greater than zero, (c) a number of threat conditions that have occurred since the occurrence of a certain event (d) an operating frequency of the power system, and (e) a magnitude of overload experienced by the switching devices.

2. The RF heating system of claim 1, wherein the protection system is configured to automatically record a detected threat condition to an operating log.

3. The RF heating system of claim 2, wherein the operating log is maintained remotely from the RF heating system.

4. The RF heating system of claim 1, wherein the disable interval is determined based, at least in part, on the number of threat conditions that have occurred within the last X seconds or since the occurrence of a certain event, wherein X is greater than zero.

5. The RF heating system of claim 4, wherein the protection system is configured to monitor the operating frequency of the power system, and the disable interval is dependent on the operating frequency and the number of threat conditions that have occurred within the last X seconds or since the occurrence of the certain event.

6. The RF heating system of claim 1, wherein the protection system is configured to monitor the temperature of a component of the power system, and the disable interval is dependent on the temperature of said component of the power system.

7. The RF heating system of claim 1, wherein the disable interval is based, at least in part, on a magnitude of an overload experienced by the switching devices.

8. The RF heating system of claim 1, wherein the RF field generator is a coil.

9. The RF heating system of claim 1, wherein the protection system is configured to select the second protection procedure in response to detecting at least Y number of threat conditions within a predetermined amount of time, wherein Y is greater than or equal to 2.

10. The RF heating system of claim 1, wherein the disable interval is less than about 0.5 second.

11. The RF heating system of claim 1, wherein the RF field generator comprises two electrodes for generating the RF field.

12. The RF heating system of claim 1, wherein the threat condition comprises a shorted output condition.

13. The RF heating system of claim 1, wherein the threat condition comprises a mismatched load condition.

14. A power system protection method, comprising:

monitoring a power system for the presence of a threat condition that threatens to cause damage to a transistor of the power system;

reducing an output of the power system in response to detecting the threat condition that threatens to cause damage to the transistor of the power system;

selecting a disable interval for the power system in response to detecting the threat condition that threatens to cause damage to the transistor of the power system; and after waiting the determined disable interval, increasing the output of the power system, wherein the selection of the disable interval is based, at least in part, on one or more of the following: (a) a sensed temperature, (b) a number of threat conditions that have occurred within the last X seconds, wherein X is greater than zero, (c) a number of threat conditions that have occurred since the occurrence of a certain event, (d) an operating frequency of the power system, (e) a magnitude of overload experienced by switching devices within the power system, and (f) a set of rules.

15. The method of claim 14 further comprising logging the detected threat condition to an operating log.

16. The method of claim 14, further comprising monitoring the operating frequency of the power system, wherein the selection of the disable interval is further based on the operating frequency of the power system.

17. The method of claim 14, further comprising monitoring the temperature of a component of the power system, wherein the selection of the disable interval is based, at least in part, on said temperature of said component of the power system.

18. The method of claim 14, wherein the threat condition comprises a shorted output condition.

19. The method of claim 14, wherein the threat condition comprises a mismatched load condition.

20. An RF heating method, comprising:

(a) using a power system comprising switching devices to provide an amount of power to an RF field generator, wherein the amount of power is amount of power;

(b) while performing step (a), automatically detecting a threat condition that may be harmful to the switching devices; and (c) in response to detecting the threat condition that may be harmful to the switching devices, performing the following steps:

(c1) automatically causing the power system to reduce the amount of power provided to the RF field generator for not more than a determined amount of time so that less than the desired amount of power is delivered to the RF field generator for the determined amount of time; and (c2) immediately after the determined amount of time has elapsed, automatically causing the power system to resume providing the desired amount of power to the RF field generator.

21. The RF heating method of claim 20, wherein the step of causing the power system to reduce the amount of power provided to the RF field generator consists of configuring the power system such that it provides no power to the RF field generator.

22. The RF heating method of claim 20, further comprising:

(d) after step (c2), detecting again the threat condition that may be harmful to the switching devices; and (e) in response to again detecting the threat condition, performing the following steps:

(e1) causing the power system to reduce the amount of power provided to the RF field generator;

(e2) waiting for a second determined amount of time to elapse; and (e3) immediately after the second determined amount of time has elapsed, causing the power system to increase the amount of power provided to the RF field generator, wherein the second determined amount of time is greater then the first determined amount of time.

23. The RF heating method of claim 22, further comprising:

(f) after step (e3), detecting yet again the threat condition that may be harmful to the switching devices; and (g) in response to yet again detecting the threat condition, causing the power system to enter into a persistent protective mode.

24. The RF heating system of claim 20, wherein the determined amount of time is less than about 1 second.

25. An RF heating system, comprising:

a radio frequency (RF) field generator;

a power system coupled to the RF field generator and configured to provide power to the RF field generator; and a protection system coupled to the power system, the protection system being configured to: (a) monitor the power system for the presence of a threat condition; (b) automatically reduce an amount of power delivered to the RF field generator by the power system for a determined amount of time in response to detecting the threat condition; and (c) automatically increase the amount of power delivered to the RF field generator by the power system after the determined amount of time has elapsed, wherein the determined amount of time is based, at least in part, on a number of threat conditions that have occurred within the last X seconds or since the occurrence of a certain event, wherein X is greater than zero, the protection system is configured to monitor an operating frequency of the power system, and the determined amount of time is dependent on the operating frequency and the number of threat conditions that have occurred within the last X seconds or since the occurrence of the certain event.

* * * * *